Figure 1:
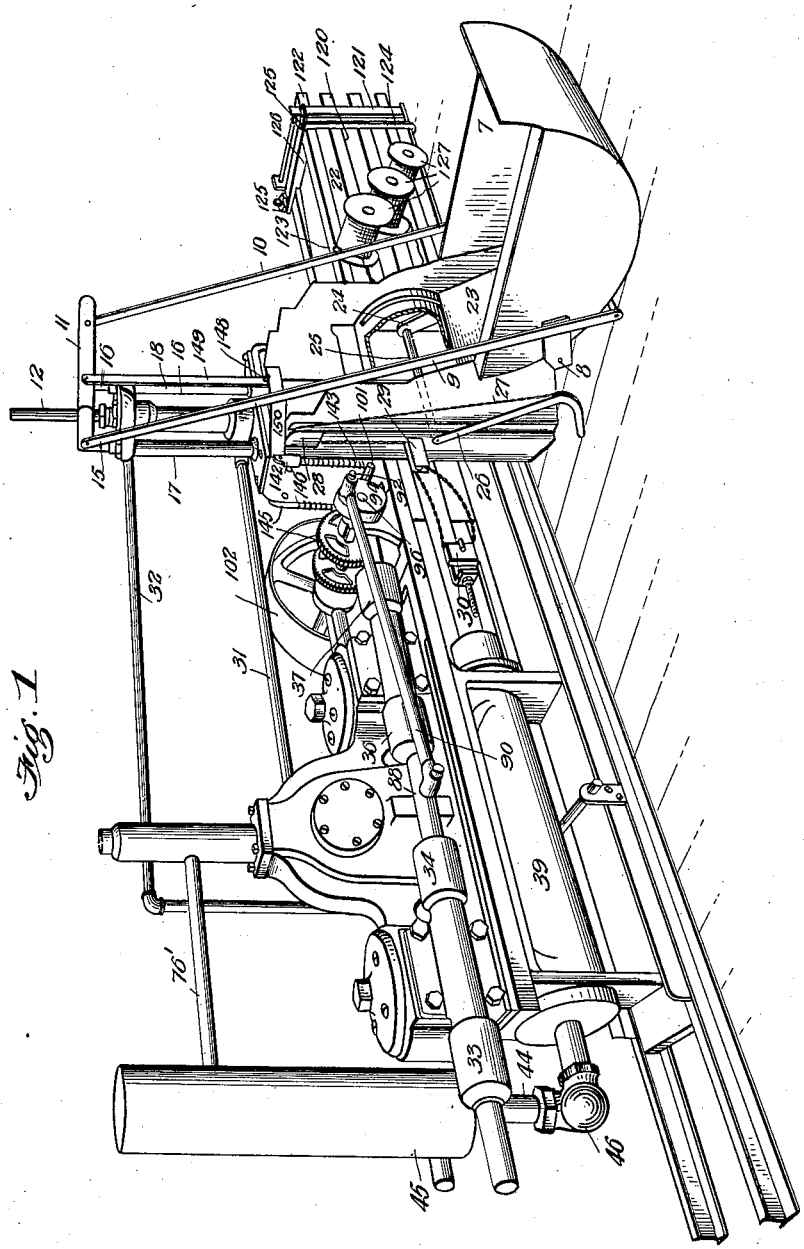

No. 861,701. PATENTED JULY 30, 1907.
S. C. BEALE.
BALING PRESS.
APPLICATION FILED JAN. 11, 1905.

3 SHEETS—SHEET 1.

Witnesses

Inventor
Samuel C. Beale
by Hazard & Harpham
Attorneys

No. 861,701. PATENTED JULY 30, 1907.
S. C. BEALE.
BALING PRESS.
APPLICATION FILED JAN. 11, 1905.
3 SHEETS—SHEET 2.
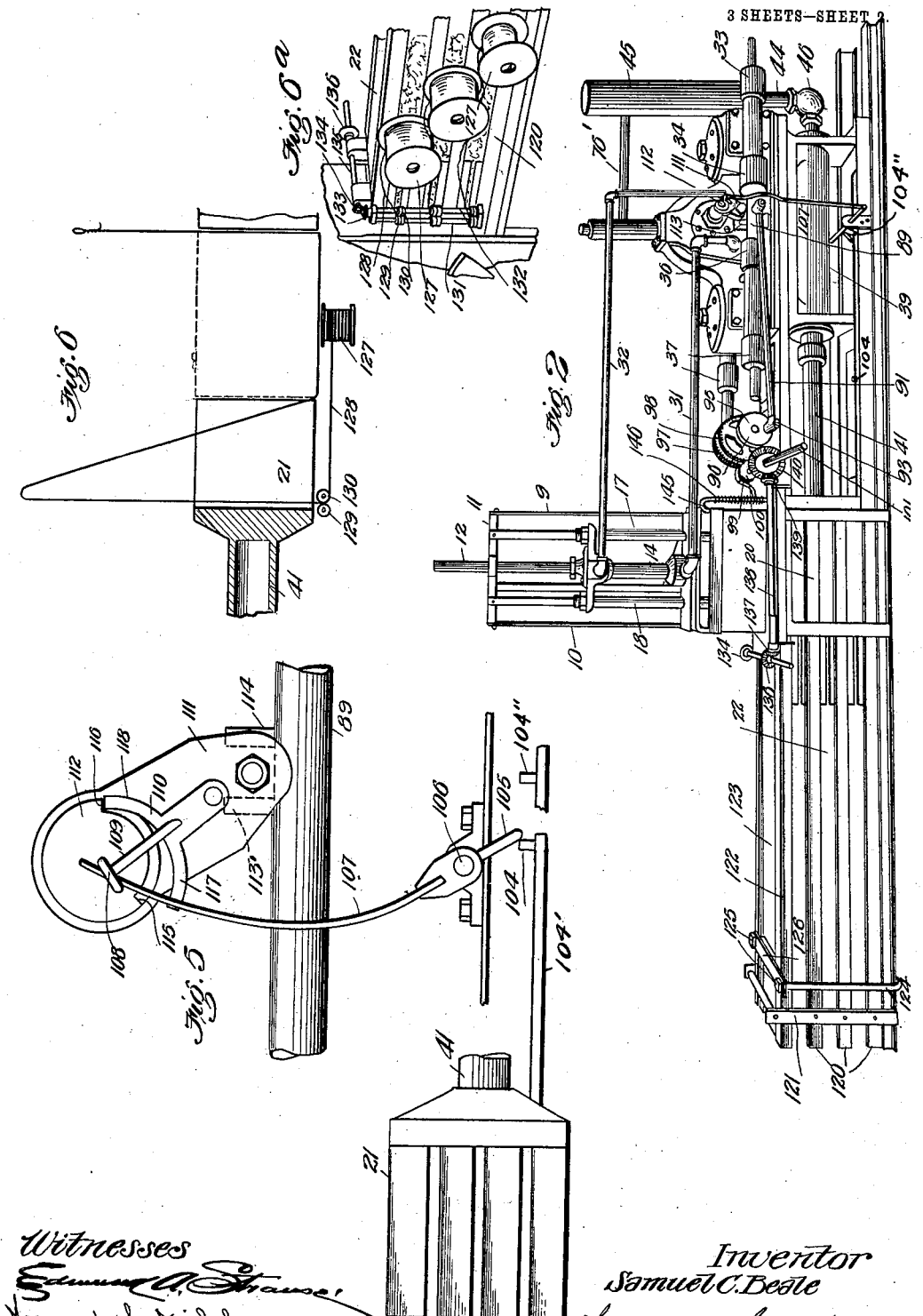
Witnesses
Inventor
Samuel C. Beale
by Hazard & Harpham
Attorneys.

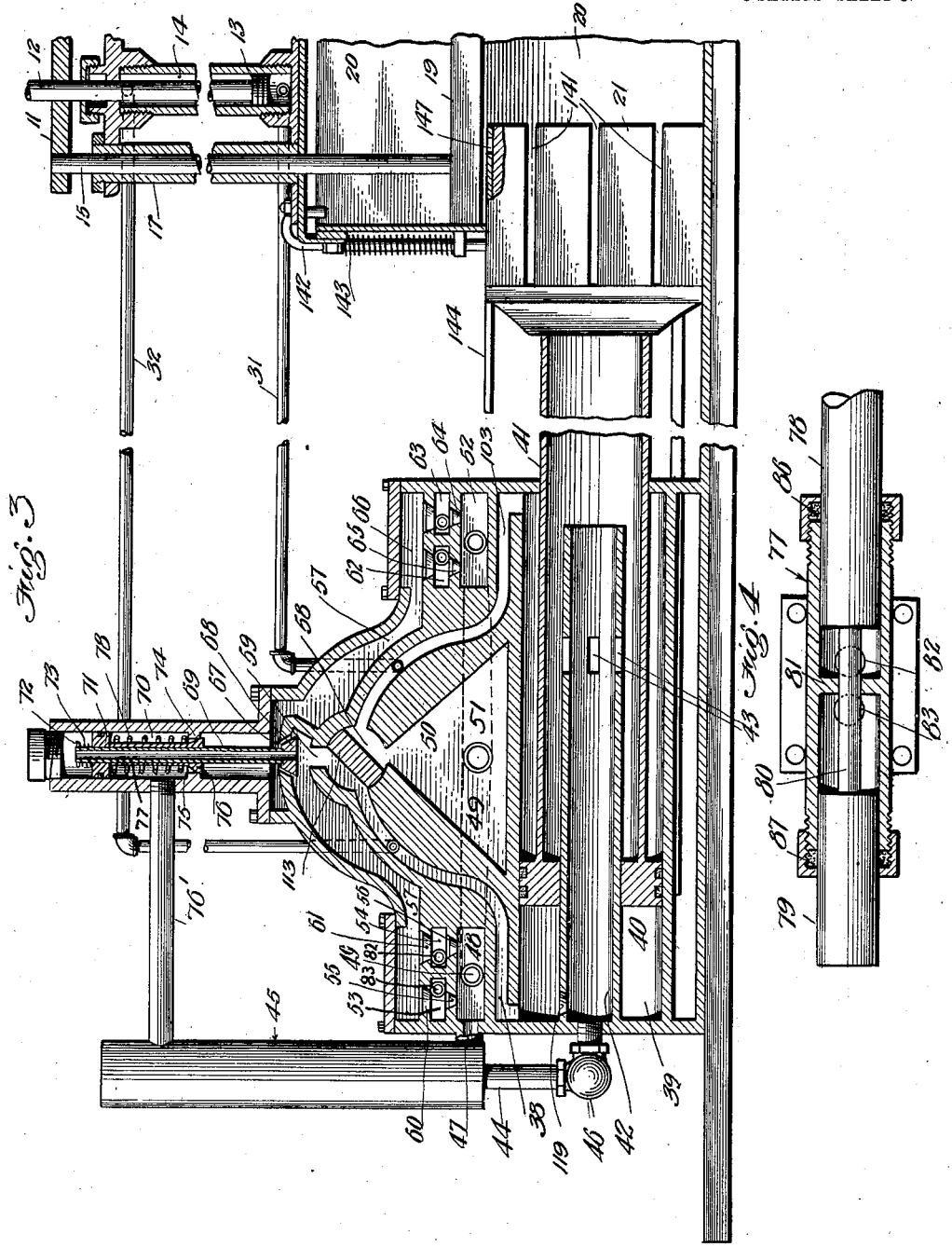

UNITED STATES PATENT OFFICE.

SAMUEL C. BEALE, OF LOS ANGELES, CALIFORNIA, ASSIGNOR TO BEALE MANUFACTURING COMPANY, OF SANTA ANA, CALIFORNIA.

BALING-PRESS.

No. 861,701.  Specification of Letters Patent.  Patented July 30, 1907.

Original application filed April 24, 1904, Serial No. 205,385. Divided and this application filed January 11, 1905. Serial No. 240,628.

*To all whom it may concern:*

Be it known that I, SAMUEL C. BEALE, a citizen of the United States, residing at Los Angeles, in the county of Los Angeles and State of California, have invented new and useful Improvements in Baling-Presses, of which the following is a specification.

My invention relates to a press designed to compress by hydraulic power any desired material such as hay, straw, cotton and like substances and to bind the compressed material with wires into a bale; and the object thereof is to produce a baling machine with great compression power and rapid action.

In the accompanying drawings forming a part of this application I have illustrated my press as adapted for baling hay and will describe it herein as applied to that purpose, although it is equally well adapted for baling other substances.

In the drawings Figure 1 is a perspective view taken from the feed side of the machine, the supporting mechanism being omitted for clearness of illustration. Fig. 2 is a perspective view of the opposite side of the machine. Fig. 3 is a central vertical longitudinal section of the hydraulic mechanism with a portion of the connected parts shown in elevation. Fig. 4 is a central vertical longitudinal section of two adjacent pump chambers with the piston and connecting rod shown in elevation. Fig. 5 is a side elevation of the exterior portion of the valve reversing mechanism. Fig. 6 is a diagrammatic plan in section of a portion of the wiring apparatus with the plunger head shown in section. Fig. 6ª is a detail of the wiring mechanism.

The description and operation of my machine is as follows:—

The hay is thrown into the feed hopper 7 which is pivoted at 8 to the frame of the machine. The feed hopper is supported in its open position as shown in Fig. 1 by rods 9 and 10 pivotally connected thereto and to the U-shaped frame 11 rigidly secured to the piston stem 12 which is attached to feed piston 13, which piston reciprocates backward and forward in the feed piston chamber 14. At each side of the piston stem and rigidly secured to the U-shaped frame 11 are attached plunger rods 15 and 16 which have a vertical movement through guides 17 and 18 secured to the frame.
To the lower end of these plunger rods is secured the feed plunger 19 which carries the hay downwardly from the upper portion of the reception chamber 20 to the lower portion thereof and holds the same in the path of the compression plunger 21 until it is pushed out thereby into the baling chamber 22. In the rear portion of the feed hopper is an ejecting apron 23 mounted on arms 24, which arms are rigidly secured upon shaft 25, revolubly mounted in the frame. To the exterior end of shaft 25 is secured operating arm 26 having attached to its outer end chain 27 which passes up over bearing 28 secured to the frame, thence down over a bearing 29 secured to the frame, thence over a bearing 30 secured to plunger 21 and has its other end secured to the frame. These bearings are all roller bearings and are so arranged that when the compression plunger is at the extreme limit of its back stroke arm 26 will be brought into a vertical position thereby carrying the ejector apron 23 through the feed hopper to carry out of the hopper all of the hay contained therein and force the same into the top of the reception chamber, at which time the ejecting apron forms a closure for the side of the top portion of the reception chamber. At this time the feed plunger is at the top of the reception chamber and the compression plunger is at the extreme limit of its inner stroke, and the pumps hereafter to be mentioned are exhausting oil from the bottom of chamber 14, through pipe 31 and are forcing it into the top of chamber 14 above piston 13 through pipe 32 which causes the downward movement of the piston and its stem, which through connecting mechanism causes the feed plunger 19 to carry the hay out of the upper portion of the reception chamber into the lower portion thereof. The feed plunger then remains stationary and the compression plunger then moves through the bottom of the reception chamber and pushes the hay out into the baling chamber. This movement of the compression chamber is caused by the pumps 33—34—36 and 37, which as the compression plunger moves through the bottom of the reception chamber to push the hay into the baling chamber are forcing oil through channel 38 into the rear end of compression cylinder 39 in which cylinder piston 40 reciprocates.

Compression piston 40 is provided with a hollow stem 41 which is rigidly secured to the compression plunger and operates the same. Within the compression cylinder and passing through the compression piston is a hollow abutment cylinder 42 which is rigidly attached to the end wall and forms a guide therefor. Near the forward end of this cylinder it is provided with a plurality of ports 43 through which fluid may flow into the interior thereof after the piston has passed outwardly on said cylinder to a point beyond said ports. Now when the compression piston is moving outwardly that is toward the baling chamber it will be observed that the pressure of the oil is against the cylinder which surrounds the abutment cylinder, thereby causing the piston to move very rapidly until it reaches a point where the fluid will enter the interior thereof through ports 43, and thereafter the pressure of the fluid will be exerted not only against the face of the piston but also against that portion of the head of the compression plunger within the hollow piston stem. This will cause a much slower movement of the compression plunger, but will give it a much greater power as the area subjected to hydraulic pressure is doubled. To prevent a vacuum being formed in the abutment cylinder, a pipe 44 connects the interior thereof with oil reservoir 45. On this pipe is a downwardly opening check valve 46 which permits the oil to pass from the reservoir through pipe 44 but prevents its return. The oil reservoir is connected by channel 47 with supply chamber 48 which supply is connected by pipe 49 shown in dotted lines in Fig. 3, with distributing chamber 50. A pipe 51 shown in dotted lines in Fig. 3 connects with a supply chamber 52 on the opposite side thereof. Above supply chamber 48 are the suction chambers 53 and 54, and the communication between these repsective chambers and the supply chambers is controlled by upwardly opening check valves 55 and 56. Above these suction chambers is a channel 57 which is in communication with valve chamber 58 through port 59. The communication between the suction chambers and this channel is controlled by the upwardly opening check valves 60 and 61. Above the supply chamber 52 are suction chambers 62 and 63 and the communication between said chambers and the supply chambers 52 is controlled by the upwardly opening check valve 64 and 65. Above these last suction chambers is a channel 66 which is in communication with channel 57 through port 67. Port 67 is adapted to be controlled by valve gate 68 which is mounted on the hollow stem 69, which stem passes upwardly through the regulating valve chamber 70 and through a piston 71 mounted in said valve chamber, and is provided with a pin 72 in the end thereof. Between said pin and said piston is a spiral spring 73 which is adapted normally to hold valve gate 68 to close port 67. The regulating valve chamber has a partition 74 therein provided with a port 75 therethrough which is controlled by valve gate 76 secured to the hollow stem 77, which stem is rigidly secured to the piston 71. Intermediate this piston and partition is coiled spring 78 which is adapted to normally hold valve gate 76 to close port 75 in partition 74. That portion of the valve regulating chamber between the partition and piston is in communication with the oil reservoir through a pipe 76′.
In Fig. 4 I have shown a detail of two adjacent pump chambers in which 77 is the pump barrel and 78 and 79 are the pistons therein which are connected together by the stem 80. A partition wall 81 separates the two pumping chambers, the stem 80 passing therethrough.
Assuming that these chambers are adjacent to chambers 53 and 54, port 82 in the wall between the chambers opens into chamber 52, and port 83 opens into chamber 54. There are stuffing boxes 86 and 87 on the ends of the pump barrels. There are eight pumping chambers altogether which are arranged in pairs, and each pumping chamber is connected by a channel with a suction chamber, of which channels there is one for each of the eight different pumping chambers and which open into separate suction chambers. The pistons of the respective pairs of pumps on each side of the machine are connected together by connecting rods 88 and 89 to which are secured pitman rods 90 and 91. These pitman rods are connected to the crank pins 92 and 93 carried by crank disks 94 and 95 which are mounted upon shaft 96. On this shaft are mounted gears 97 and 98 which mesh with smaller gears 99 and 100 mounted on the driving shaft 101 which carries the power pulley 102 to which power is applied to operate the machine from any suitable mechanism, not shown. Now when power is applied to rotate the driving shaft it will be seen that the pump pistons are reciprocated in their respective pump barrels, and that in each of the pairs of pumps the piston on one side of the partition wall between them will approach the same as the other recedes therefrom. Now before applying power thereto the respective chambers are all filled with oil or other liquid, oil being the preferred liquid. Now when the pump pistons are in the position shown in Fig. 4 and the other parts as shown in Fig. 2 and some of the other figures, the movement of each of the pump plungers will cause the oil to be forced out of the supply chamber and thence into the suction chamber to which it is connected, from whence it will flow into the channel above such suction chamber passing therethrough into and through the valve chamber and out through the channel connected therewith which leads into the compression cylinder at the rear of the piston, thereby causing the outward movement thereof to carry the compression plunger through the bottom of the reception chamber to force the hay into the baling chamber. As the compression plunger piston moves outwardly the oil from the outer end thereof is forced through channel 103, which is also connected with the distributing chamber 50, from which chamber the oil passes to supply chambers 48 and 52, thence into those suction chambers that are not connected with the pumping chambers from which oil is being forced out of, and thence through the connecting channel into the pumping chamber whose piston is moving away from the dividing partition. Just before the compression plunger reaches the outer end of the compression cylinder, a pin 104 carried by rod 104′ engages with an arm 105, which arm is rigidly secured to a shaft 106 and partially rotates the shaft. This shaft carries a spring arm 107 which arm passes through the eye 108 in the central arm 109 of the reversing dog 110, which dog is pivoted to arm 111 rotatably mounted upon axle 112 which axle carries valve 113 that works in valve chamber 58. Arm 111 is engaged by pins 113′ and 114 rigidly affixed to connecting rod 89 and is moved to rotate on said shaft 112 as the connecting rod is reciprocated. Shaft 112 is provided with shoulders 115 and 116 with which side arms 117 and 118 of the reversing dog are adapted to engage respectively when the reversing dog is thrown by spring arm 107 from one position to another. Rod 104′ is carried by plunger 21. In Fig. 5 the position of the parts is shown just after the valve 113 has been thrown to reverse the flow of oil from the direction in which the oil is flowing as shown in Fig. 2. The plunger piston will then travel in the reverse direction and the flow of oil will also be in the reverse direction to that shown in Fig. 2 before described. On the backward movement of the compression piston plunger the oil will flow to the compression piston chamber through channel 103 and will be forced out of the other end and back into the compressing plunger chamber 39. That portion of oil which remains in the abutment cylinder and in the compression plunger stem passes through an upwardly opening check valve 119 in the rear portion of the abutment cylinder. As pipe 31 opens into channel 103 it will be seen that as soon as the oil is forced by the pumps through this channel, piston 13 moves upwardly thereby through connecting mechanism carrying the feed plunger to the upper end of the reception chamber and closing the feed hopper, and that as soon as the compression plunger has made its backward stroke the ejector plunger has ejected the contents of the feed hopper apron into the reception chamber. The completion of the backward stroke of the compression plunger causes pin 104″, carried by rod 104′, to engage arm 105 to move the same to cause the reversal of the position of the valve 113 and the oil then flows in the reverse direction driving the plunger on its forward course to compress the hay into the baling chamber. The flow of the oil in this direction causes a portion of it to be discharged through pipe 32 into the feed chamber above piston 14 which causes piston 13 to move downwardly, thereby carrying the feed plunger to cause the hay to be ejected from the upper portion of the reception chamber into the lower portion thereof. In the formation of the latter part of the bale more pressure is required than in the formation of the first part of the bale and in order to obtain this high pressure with a medium amount of power, the forward pumps on each side of the machine are cut out as follows: We will say that it requires 200 pounds of pressure to effect the final compression of the hay, in such case the spring 78 in the pressure regulating chamber 70 has a regulated tension of 100 pounds. Now when the pressure rises to an amount in excess of 100 pounds, as the oil passes up through stem 69 piston 71 will be forced downwardly by the oil pressure thereon to compress the spring thereby opening port 75 and permitting the oil pumped by the forward pumps to pass through port 75 and thence through pipe 76′ into the storage reservoir from whence it may pass into the supply chamber 48. This relieves the pressure on the upper face of valve gate 68 and it immediately seats itself and closes port 67, and thereafter as long as the compression plunger is on its outward stroke it is moved by the pressure of the oil forced by rear pumps, which pumps may now be driven to exert the required pressure upon the hay. The reversal of the flow of oil restores the equilibrium, and on the return movement of the compression plunger all pumps operate to return it, and in sending the compression plunger outwardly on its compression stroke the pumps all operate together as before explained until the compression power rises to an excess of 100 pounds when the forward pumps are cut out as before explained. By this construction when the pressure is low, great rapidity of movement of the parts is obtained, and when the pressure must be high a portion of the pumping mechanism is cut out, thereby giving the parts a slower motion but enabling the use of the other parts to give the desired pressure with a minimum amount of power.

It will be observed that the baling chamber has slatted sides 120 which are rigidly secured to the end frame 121, and that the top is formed of the angle irons 122 and the plate 123 which are not secured to the end frame. A yoke 124 surrounds the rear end of the baling chamber and has the upper ends thereof threaded and provided with nuts 125, below which nuts is a tension bar 126. Now by screwing down these nuts upon this bar the outlet of the baling chamber may be contracted to any desired extent which will cause the ejection of a bale of hay therefrom to form an abutment which will give the necessary pressure to a bale being formed at the other end thereof. As soon as the bale has been formed with the desired quantity of hay compressed to the required tension it is ready to be tied, which is accomplished in the following manner: On the sides of the baling chamber are as many spools of wire 127 as it is desired to have strands of wire around the bale. The wire 128 passes from the spool between rollers 129 and 130 which are mounted on shafts 131 and 132. Shaft 131 is provided with a miter gear 133 which is adapted to be engaged by miter gear 134 mounted on shaft 135. These gears are normally out of engagement. On the end of shaft 135 opposite the gear 134 is a miter gear 136 through which the shaft is longitudinally movable when it is desired to cause the engagement of miter gear 134 with miter gear 133 which must be done when the wire is to be drawn off the spool as hereafter explained. Miter gear 136 meshes with a like miter gear 137 on shaft which carries at its other end bevel gear 139 which engages a bevel gear 140 on the driving shaft. The operator then, with a block in his hand, presses on the end of shaft 135 and moves it longitudinally through gear 136, and thereby causes miter gear 133 and 134 to be brought into engagement, when the rotation of the shaft 131 will cause the pulleys to force the wire through slots 141 of the compression plunger and out of the other side of the machine to the required distance, when the operator releases the pressure on shaft 135 which permits the disengagement of miter gears 133 and 134 and the further feeding of the wire through these slots ceases. It should be explained that in the first instance the wire is fed across before any hay is pushed out into the baling chamber, and that each succeeding feed of hay which is forced into the baling chamber by the compression plunger carries the wire backwardly or toward the outlet thereof, that one end of the wire hangs through the slot in the baling chamber, so that when the bale is fully formed and the wire runs through the slots in the compression plunger and to the outside of the baling chamber the operator may cut the same and tie one end thereof with this projecting end while the other end passes backwardly as the next bale is being formed. It will be understood that the wire comes through the slot double, and must be cut and one end looped or tied to the other end of the same wire that projects on this side of the baling chamber, and that the length of time which is taken in the formation of a bale is sufficient for the operator to tie all three strands of wire. On the outside of the upper part of the reception chamber is a catch bar 142 whose top curves inwardly and downwardly into the top portion of the reception chamber as best shown in Fig. 3. This catch is held spring pressed downward by spring 143 and the lower end of the bar drops in behind a plate 144 affixed to the top of the compression plunger when it has made its full stroke into the baling chamber and prevents the return of the compression plunger until the catch is drawn upwardly out of the path of said plate by the return of the feed plunger to the upper portion of the reception chamber, where it engages the projecting end of the catch and raises the lower end up above the path of movement of the plate affixed to the compression plunger. On the opposite side of the upper portion of the reception chamber is catch bar 145 which is adapted to be forced by spring 146 into a hole 147 in the top of the compression plunger when the compression plunger has reached the extreme limit of its backward stroke and hold said plunger against forward movement until the catch is released, which is effected by pin 148 which is rigidly affixed to bar 149, which bar is carried by U-shaped frame coming in contact with arm 150, which arm is pivotally connected to the catch bar 145 and depressing the outer end thereof to raise catch bar out of hole 147, which is accomplished when the feed plunger has made its full downward movement in top of the reception chamber. Arm 150 projects over the side wall of the top of the reception chamber which it uses as a fulcrum to release the catch. As soon as this catch is released the compression plunger is free to move forward through the reception chamber and into the baling chamber. As before explained it will be seen that the first movement of the oil in one direction will be to raise the feed plunger to the top of the reception chamber and release the catch that holds the compression plunger against backward movement before the oil pressure comes against the piston with sufficient force to make any great strain on the catch, and that likewise on the reversal of the flow the oil is pumped into the feed chamber above the piston therein causing the complete movement of the feed plunger downwardly thereby releasing the other catch, before any considerable pressure is put upon the feed plunger piston to force the same forward, thereby keeping the feed plunger piston stationary when the compression plunger is moving, and the compression plunger stationary when feed plunger is moving. Where great compression power is desired the pumps which perform the final compression may have the piston area thereof smaller than those which are cut out when the pressure rises to a predetermined point. If desired the compression plunger may be operated by a single pair of pumps. I have illustrated my hay press as being operated by four pairs of pumps, as that number of pumps I have found in practice produces a very satisfactory and quick acting hay press, which may be operated with the minimum amount of power.

This application is a division of an application filed by me April 24th, 1904, No. 205,385.

Having described my invention what I claim as new and desire to secure by Letters Patent is:—

1. In a baling press a reception chamber; a feed hopper at one side thereof, an ejector apron, said apron being movable through said feed hopper after said hopper has been moved to the upper portion of the side of said reception chamber; means to move said feed hopper to the upper portion of the side of said reception chamber; means to move said ejector apron through said feed hopper.

2. In a baling press, a reception chamber; a feed plunger vertically movable through the upper portion thereof; a feed hopper at one side thereof, said feed hopper being vertically rotatable to bring it to close the open side of the top portion of the reception chamber; an ejector apron adapted to be moved therethrough to eject the contents thereof into the top portion of the reception chamber; means to move said feed hopper; means to move said apron; means to move said plunger.

3. In a baling press, a reception chamber having one side of the upper portion thereof open; a baling chamber at one side of the lower portion thereof and opening thereinto; a feed plunger vertically movable through the upper portion of said reception chamber; hydraulically operated means to move said feed plunger; a vertically rotatable feed hopper pivotally connected to said reception chamber at one side of the lower portion thereof and adapted to be moved to close the open side of the upper portion of the reception chamber; hydraulically operated means to move said feed hopper; an ejector apron adapted to be moved therethrough after said hopper is brought to the upper portion of said reception chamber; means to operate said ejector apron.

4. In a baling press, a reception chamber having one side of the upper portion thereof open; a baling chamber at one side of the lower portion thereof and opening thereinto; a feed plunger vertically movable through the upper portion of said reception chamber; a vertically rotatable feed hopper pivotally connected to said reception chamber at one side of the lower portion thereof and adapted to be moved to close the open side of the upper portion of the reception chamber; means to move said feed hopper and said feed plunger comprising a feed plunger piston chamber, a piston working therein and operatively connected to said feed hopper and feed plunger; means to supply liquid into said piston chamber alternately at the ends thereof; a compression plunger adapted to be moved through the lower portion of the reception chamber and into and out of the baling chamber; a connection between said compression plunger and said ejector apron adapted to cause said apron to move through said feed hopper on the movement of the plunger out of the baling and reception chambers; means to operate said compression plunger comprising a compression plunger piston chamber; a piston therein operatively connected to said compression plunger; means to alternately supply liquid into the opposite ends of said compression plunger piston chamber.

5. In a baling press, a baling chamber; a compression plunger having a slotted head; means to cause said plunger to compress material in said chamber; means to bind said material, comprising a plurality of spools of wire; means to force a portion of wire from each spool through a slot in the compression plunger comprising revoluble rollers between which the wire from the roll passes; means to cause the revolution of said rollers when desired.

In witness that I claim the foregoing I have hereunto subscribed my name this 29th day of Dec., 1904.

SAMUEL C. BEALE.

Witnesses:
G. E. HARPHAM,
HENRY T. HAZARD.